(12) United States Patent
Hofer et al.

(10) Patent No.: US 7,055,233 B1
(45) Date of Patent: Jun. 6, 2006

(54) DEVICE AND METHOD FOR ASSIGNING A TOOL TO A WORKPIECE

(75) Inventors: Josef Hofer, Frontenhausen (DE); Robert Donharl, Gangkofen (DE)

(73) Assignee: Bayerische Motoren Werke AG, Munich (DE)

( * ) Notice: Subject to any disclaimer, the term of this patent is extended or adjusted under 35 U.S.C. 154(b) by 548 days.

(21) Appl. No.: 10/130,349

(22) PCT Filed: Nov. 11, 2000

(86) PCT No.: PCT/EP00/11186

§ 371 (c)(1),
(2), (4) Date: Sep. 30, 2002

(87) PCT Pub. No.: WO01/38897

PCT Pub. Date: May 31, 2001

(30) Foreign Application Priority Data

Nov. 19, 1999 (DE) .................... 199 55 646

(51) Int. Cl.
*G01S 5/26* (2006.01)
*G05B 19/418* (2006.01)

(52) U.S. Cl. ............................ 29/430; 29/429; 29/431; 29/407.1; 29/407.09; 29/712; 29/783; 29/791; 700/112; 700/113; 700/114; 700/115; 700/116

(58) Field of Classification Search .................. 29/428, 29/712, 430, 431, 711, 783, 791, 407.09, 29/407.1, 709, 429; 700/112, 113, 114, 115, 700/116
See application file for complete search history.

(56) References Cited

U.S. PATENT DOCUMENTS 4,086,522 A * 4/1978 Engelberger et al. .. 318/568.13
4,669,168 A * 6/1987 Tamura et al. ................ 29/429
4,670,974 A * 6/1987 Antoszewski et al. ........ 29/701
4,789,940 A * 12/1988 Christian ..................... 700/113
5,910,894 A * 6/1999 Pryor ........................... 700/95
6,928,332 B1 * 8/2005 Gass ........................... 700/108

FOREIGN PATENT DOCUMENTS

| EP | 0 492 015 A1 | 12/1990 |
| GB | 2 327 290 A | 10/1998 |
| JP | 60107579 | 6/1985 |

OTHER PUBLICATIONS

Yoshida et al. "Cooperative self-positioning system for multiple mobile robots." Proceedings of the 2003 IEEE/ASME International Conference on Advanced Intelligent Mechantronics, pp. 223-227, 2003.*
PCT International Search Report.

* cited by examiner

*Primary Examiner*—Eric Compton
(74) *Attorney, Agent, or Firm*—Crowell & Moring LLP

(57) ABSTRACT

For assigning a tool to a workpiece conveyed on an assembly line, at least one transmitter is arranged in the area of an assembly line, and a receiver is arranged on the tool. An analyzing unit determines the distance of the tool from each transmitter, based on the transit times of at least one received signal, and an indicating device emits positions information regarding workpieces on the assembly line. An assignment unit assigns a tool or a tool position to a workpiece, based on at least one distance of the tool from the transmitter, and on the workpiece positions. The arrangement of the transmitters and receivers can also be interchanged.

28 Claims, 2 Drawing Sheets

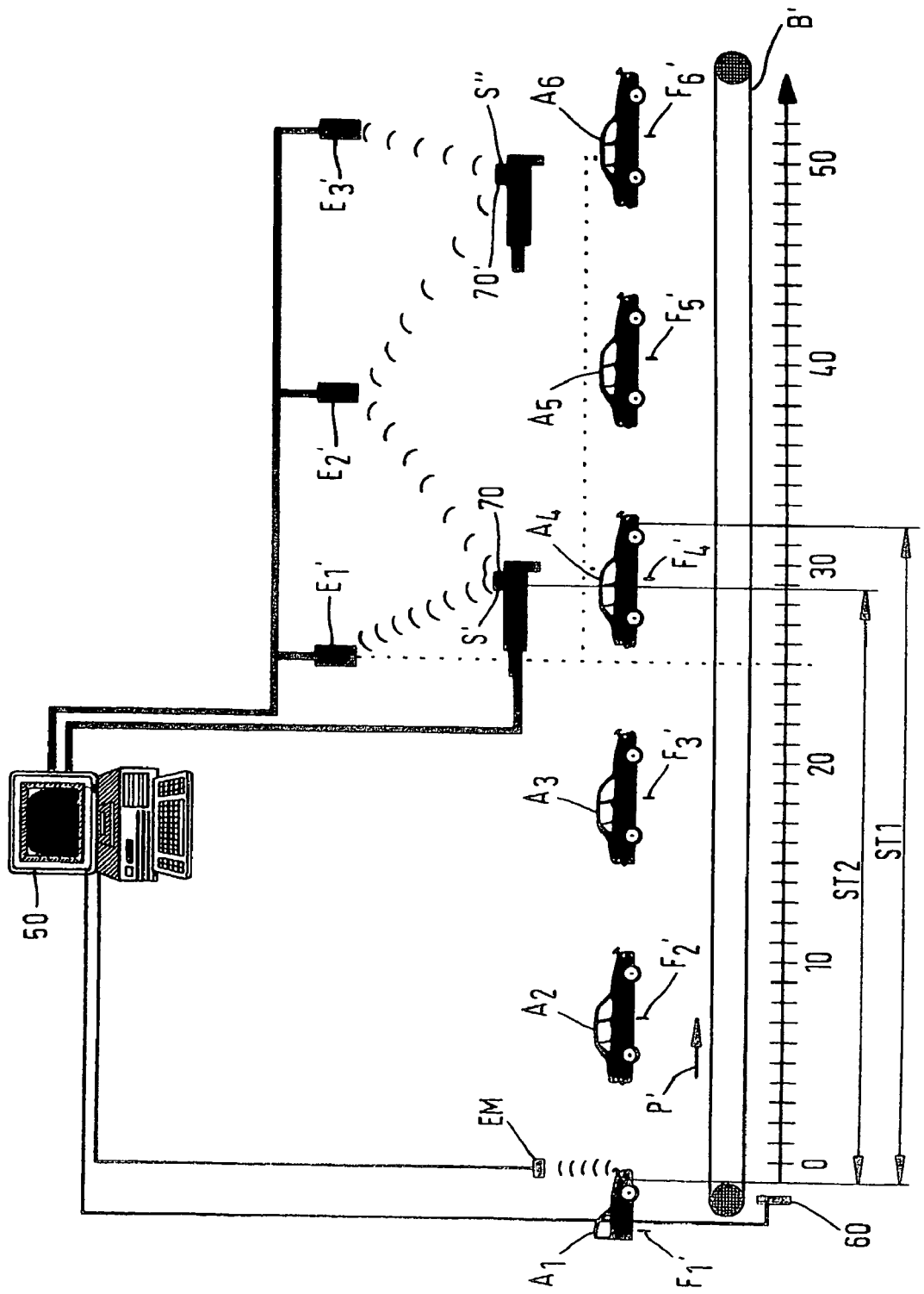

DEVICE AND METHOD FOR ASSIGNING A TOOL TO A WORKPIECE

BACKGROUND AND SUMMARY OF THE INVENTION

This application claims the priority of German patent document 199 55 646, filed 19 Nov. 1999 (PCT International Application No. PCT/EP00/11186, filed 11 Nov. 1999), the disclosure of which is expressly incorporated by reference herein.

The invention relates to a method and apparatus for assigning a tool to a workpiece on an assembly line.

In the assembly line production of workpieces, tools operated by workers can only rarely be assigned to a certain part to be worked. In particular, it is impossible to determine where a tool is situated with respect to a workpiece located on an assembly line. Thus, it could happen, for example, that workpieces, such as vehicles, leave the assembly without the certain screwed connections. Checking is not easily performed.

It is an object of the present invention to provide a method and apparatus which permit the assignment of tools to a workpiece conveyed on an assembly line.

This and other objects and advantages are achieved by the method and apparatus according to the invention, in which the position of a tool is detected either relative to a workpiece or relative to a stationary system of coordinates and is assigned to a workpiece situated on the assembly line. In this case, an identifier (for example, a production or chassis number) is assigned to each workpiece, and the position of the tool is detected by analysis of the transit times of signals emitted by a transmitter and received by a receiver. The position of the tool can be computed by way of trigonometric functions. According to an embodiment, a transmitter or a receiver is arranged on the tool. The arrangement of a receiver on a tool has the advantage that disturbances caused by the tool operation have a less interfering influence. Depending on whether a transmitter or a receiver is arranged on the tool, the pertaining counterparts (the receivers or the transmitters) are provided in the area of the assembly line.

According to a preferred embodiment, the receivers or transmitters not arranged on the tool are stationary in space. As a result of the analysis of the transit times between the transmitters and the assigned receivers, the absolute position of the tool can be indicated in the space.

In the case of a tool which is movable in all direction, three transmitters (or alternatively, three receivers) are required in order to achieve an unambiguous localization in space. However, when the tool is movable in only one defined direction with respect to the vehicle, a single transmitter (or alternatively construction, a single receiver) may be sufficient.

According to another embodiment, a transmitter (alternatively a receiver) can also be moved along on the assembly line, for example, together With a certain workpiece, so that, by distance measurement, information can already be derived with respect to the distance of the tool from the transmitter (alternatively, the receiver) arranged on the workpiece.

By means of the already existing knowledge of identifiable workpieces on the assembly line and their known momentary positions, a time-related assignment of a tool to a workpiece can be made from the position of the receiver (alternatively, the transmitter) arranged on the tool. According to the detection rate of the tool position, precise information can therefore be obtained as to whether the tool has been guided to a particular position of a workpiece that has a known identification. By storing these data, an overall check is possible as to whether a tool has been guided to a workpiece.

The method and apparatus according to the invention can basically be used for all tools for which the assignment to a workpiece is important. On the whole, the present invention is less expensive and can be used in a more flexible manner than known mechanical devices.

According to an advantageous embodiment, ultrasonic devices can be used as the transmitters and receivers. The transmitters can emit gradually triggered signals; or as an alternative, each transmitter emits characteristic signals. The emitted signals are received by the receiving unit and are assigned to the corresponding transmitters. From the transit times of the signals, the distances can then be computed between the respective transmitters and receivers and the position of the tool can be determined in this manner.

As mentioned above, when at least three transmitters (alternatively, three receivers) are used, an unambiguous position determination can be made also in the case of a tool which is freely movable. In this case, a zero point can be determined and the position of the tool can be indicated with respect to this zero point.

For checking the assembling progress, it is advantageous for the data for the assignment of a tool to a vehicle supplied by an assignment unit to be stored in a memory, particularly a non-volatile memory. The data can also be received in a memory medium to be stored, so that the assembling progress can be precisely checked for an extended time period.

According to a preferred embodiment, it is also detected and recorded whether the tool (for example, an electric screwdriver), has been operated according to its function. Thus, not only can the guiding of the tool to a certain vehicle be reconstructed, but also its proper functional operation at a certain point. For example, in the case of an electric screwdriver, it can be determined by way of the applied torque whether the screwed connection was carried out correctly. When the electric screwdriver is operated without applying the latter to the screw or when a screw is twisted off, no expected torque will occur so that no proper screwed connection on a defined identifiable workpiece can be reported. Such feedback of properly implemented working steps can take place in the case of all operable tools and can, in turn, be assigned to workpieces.

Other objects, advantages and novel features of the present invention will become apparent from the following detailed description of the invention when considered in conjunction with the accompanying drawings.

BRIEF DESCRIPTION OF THE DRAWINGS

FIG. 3 is another schematic representation of vehicles arranged on an assembly line with respect to a transmitter arranged on a tool, the position of the transmitter being determined by receivers.

DETAILED DESCRIPTION OF THE DRAWINGS

Although the invention will be now described in the context of assembly of a vehicle. The method according to the invention can also be used for all other workpieces which are identifiable and are transported on an assembly line.

Figure 1:
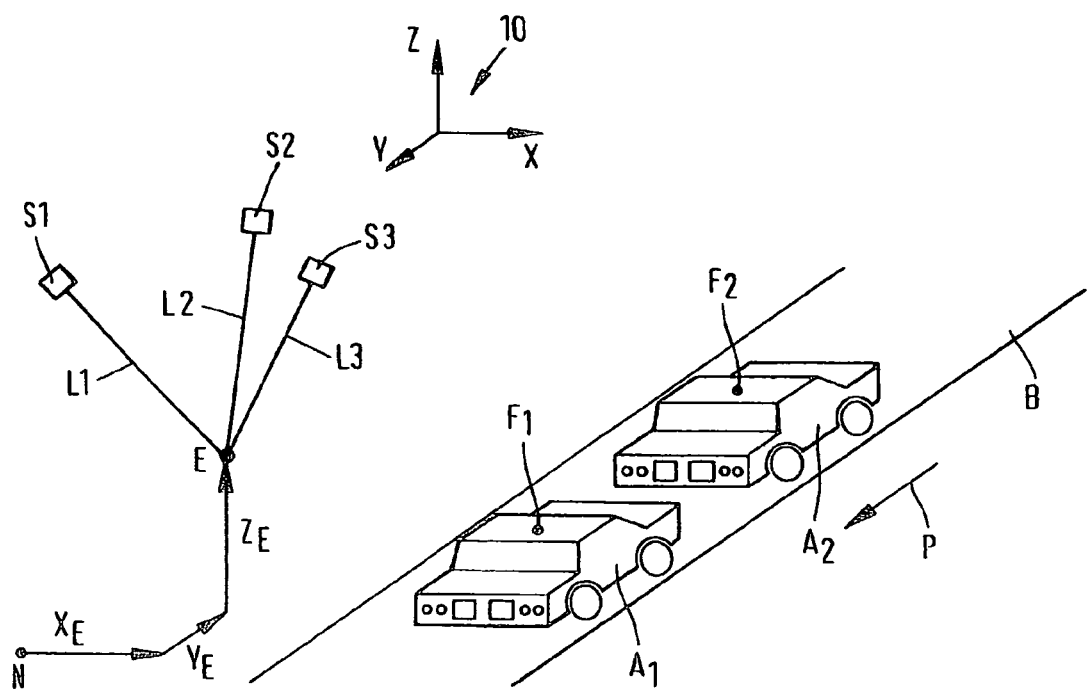
FIG. 1 is a schematic representation of vehicles arranged on an assembly line with respect to a receiver arranged on a tool, the position of the receiver being determined by means of transmitters.

FIG. 1 is a schematic view of an assembly line B on which various unambiguously identifiable vehicles (in this case, two) $A_1$ and $A_2$ are moved in the direction of the arrow P. A vehicle position $F_1$ and $F_2$ respectively is assigned to each vehicle $A_1$ and $A_2$. In this case, each vehicle position of a just assembled vehicle is known in a control master system. These, positions can be indicated in a defined system of coordinates 10.

The vehicle position can be determined, for example, as follows. When a vehicle $A_1$ is placed on the assembly line B, its chassis number is read into the control master system by means of a transponder. By monitoring the advancing of the assembly line it can always be determined where on the assembly line a particular vehicle is located at a particular time.

In the area of the assembly line B, a tool is provided, in this case, an electric screwdriver (not shown in detail), on which an ultrasonic receiver E is arranged. The receiver E receives signals from ultrasonic transmitters S1, S2 and S3 which are stationarily mounted in the assembly bay. By way of the different transit times analyzed by a circuit to be explained later, the distances L1, L2 and L3 are determined between the receiver, on the one hand, and the assigned transmitters S1, S2 and S3, on the other hand. From these distances L1, L2 and L3 and the positions of the transmitters S1, S2 and S3, the coordinates of the receiver ($X\epsilon$, $Y\epsilon$, $Z\epsilon$) with respect to a defined zero point N can be computed as a whole.

Figure 2:
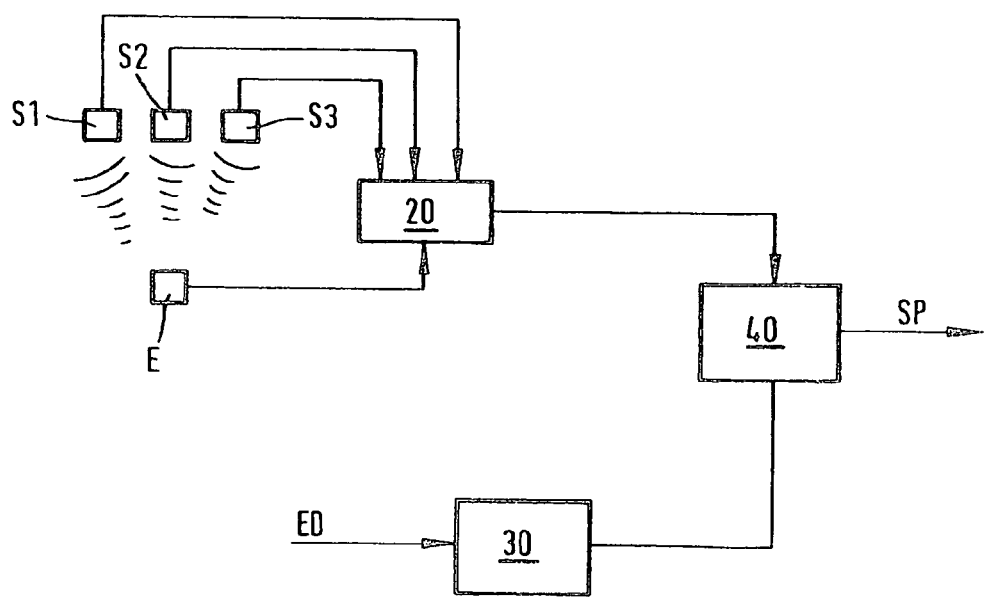
FIG. 2 is an electric wiring diagram for such a system according to the invention.

FIG. 2 is a schematic wiring diagram of the above-described system according to the invention. The transmitters S1, S2 and S3 emit gradually triggered ultrasonic signals which are detected by the receiver E. An analyzing unit 20 is connected with the transmitters S1, S2 and S3, and with the receiver E; based on the different transit times and the known positions of the transmitters, it can determine the location of the receiver in the assembly bay. This location is fed to an assignment unit 40, which also receives from an indicating device 30, the various positions $F_1$ and $F_2$ of vehicles $A_1$ and $A_2$ situated on the assembly line B. By comparing the individual positions, a tool or a tool position can be assigned to an identified vehicle.

FIG. 3 shows an alternative variant to that of FIGS. 1 and 2. Here, the arrangement of transmitters and receivers is interchanged. An assembly line B' is again schematically shown, on which the different unambiguously identifiable vehicles $A_1'$, $A_2'$, $A_3'$, $A_4'$, $A_5'$ and $A_6'$ are situated. The assembly line B' is moved in the direction of the arrow P'. A vehicle position $F_1'$ to $F_6'$ is assigned to each vehicle $A_1'$ to $A_6'$. When the vehicles $A_1'$ to $A_6'$ are placed, each emits a vehicle identification to a receiving apparatus EM by way of a transponder, which receiving apparatus EM transmits this information to a computer 50. By way of an assembly line movement detection device 60, which is also connected with the computer, the assembly line movement is known so that each vehicle position can be reconstructed on the assembly line B', and indicated relative to a defined system of coordinates.

In the area of the assembly line B', two tools 70, 70', (in this case, two electric screwdrivers), are provided, each having a respective transmitter S', S''. The transmitters S', S'' again are ultrasonic transmitters whose signals are received by ultrasonic receivers E1', E2' and E3' stationarily mounted in the assembly bay. Based on the different transit times, the distances between the transmitters S', S'', on the one hand, and the receivers E1', E2' and E3', on the other hand, are determined. In turn, from these distances and the positions of the receivers E1', E2' and E3', the coordinates of the transmitters can be computed with respect to a defined zero point.

According to FIG. 3, the transmitters S' and S'' and the receivers E1', E2', E3' emit their signals to the computer 50 which centrally comprises the analyzing unit, the indicating unit and the assignment unit separately illustrated in FIG. 2. The assignment of the tools 70 and 70' to the individual vehicles takes place analogous to the description in FIGS. 1 and 2. In the present case, the position of the tool and the positions of the vehicles F1' to F6' are compared with one another, and a tool 70, 70' is assigned to a certain vehicle if the distances are within defined ranges ST1, ST2.

By continuously detecting of the tool position, the guiding of a tool to a vehicle can be reconstructed and checked. Also, if the functionally proper tool operation, for example the proper operation of the electric screwdriver, is detected, in addition to the guiding of the tool to the vehicle, the implementation of a certain assembly operation on an identified vehicle can also be recorded. Thus, it can be checked in a simple manner whether all screwed connections to be carried out by means of an electric screwdriver were correctly finished. If a vehicle then leaves the assembly line without the implementation of the required screwed connections on this vehicle, a special indication can take place. All data can also be filed in a memory, for example, that of the computer 50.

The above described method according to the invention can of course be used not only in the assembly of vehicles, but also in the case of all workpieces to be assembled. In this case, all other tools can also be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for assigning a tool to a workpiece conveyed on an assembly line, comprising:
   at least one transmitter arranged in the area of an assembly line;
   a receiver arranged on the tool;
   an analyzing unit which determines a position of the tool relative to a defined fixed reference point, based on transit times of signals transmitted by said at least one transmitter and received by said receiver;
   a device which indicates positions of workpieces conveyed on the assembly line, relative to the assembly line; and
   an assignment unit which assigns a tool or a tool position to a particular workpiece, based on a comparison of the determined position of the tool and the workpiece positions indicated by the indicating device.

2. The apparatus according to claim 1, wherein:
   said at least one transmitter comprises a plurality of stationary transmitters, and
   positions of the transmitters are known.

3. The apparatus according to claim 1, wherein at least one transmitter moves along with an assigned workpiece on the assembly line.

4. The apparatus according to claim 1, wherein data supplied by the assignment unit are stored in a memory.

5. The apparatus according to claim 4, wherein said memory is a nonvolatile memory.

6. The apparatus according to claim 1, wherein the transmitters emit their signal in a certain sequence.

7. The apparatus according to claim 1, wherein signals emitted by a transmitter are characteristic of the particular transmitter.

8. The apparatus according to claim 1, wherein the transmitters and the receivers comprise ultrasonic devices.

9. The apparatus according to claim 1, wherein a coordinates zero point is defined with respect to which the position of the tool is determined.

10. The apparatus according to claim 1, wherein proper functional operation of a tool is detected.

11. The apparatus according to claim 10, wherein information regarding operation of the tool is also filed in a memory.

12. The apparatus according to claim 1, wherein tool position determination takes place according to one of i) set time intervals, ii) as a function of an assembly line position, and iii) after a targeted activation.

13. Apparatus for assigning a tool to a workpiece conveyed on an assembly line comprising:
   at least one receiver arranged in the area of an assembly line;
   a transmitter arranged on the tool;
   an analyzing unit which determines a position of the tool relative to a defined fixed reference point, based on transit times of signals transmitted by said transmitter and received by said at least one receiver;
   a device which indicates positions of workpieces conveyed on the assembly line, relative to the assembly line; and
   an assignment unit which assigns a tool or a tool position to a workpiece, based on a comparison of the determined position of the tool and the workpiece positions indicated by said indicating device.

14. The apparatus according to claim 13, wherein:
   the at least one receiver comprises a plurality of receivers; and
   positions of the receivers are known.

15. The apparatus according to claim 13, wherein the at least one receiver moves along together with an assigned workpiece on the assembly line.

16. The apparatus according to claim 13, wherein data supplied by the assignment unit are stored in a memory.

17. The apparatus according to claim 16, wherein said memory is a nonvolatile memory.

18. Apparatus according to claim 13, comprising a plurality of transmitters, one assigned to each of a plurality of tools, wherein the transmitters emit their signals in a defined sequence.

19. The apparatus according to claim 18, wherein signals emitted by a particular transmitter are characteristic of that particular transmitter.

20. The apparatus according to claim 18, wherein the transmitter and receiver comprise ultrasonic devices.

21. The apparatus according to claim 13, wherein a coordinate zero point is defined with respect to which the position of a particular tool is determined.

22. The apparatus according to claim 13, wherein proper functional operation of the tool is detected.

23. The apparatus according to claim 22, wherein information regarding operation of the tool is stored in a data memory.

24. The apparatus according to claim 13, wherein tool position determination takes place according to one of i) set time intervals, ii) as a function of an assembly line position, and iii) after a targeted activation.

25. A method for coordinating positioning of a tool and a workpiece, comprising:
   a first sensor continuously determining time-related position of the tool relative to a defined fixed zero point;
   continuously monitoring time-related position of the workpiece relative to a reference system, based on position information from a source of position information which is different from said first sensor;
   comparing the determined time-related position of the tool with the monitored time-related position of the workpiece; and
   generating a time-related assignment of the tool to the workpiece, based on a result of said comparing.

26. The method according to claim 25, wherein said generating step comprises determining whether the tool has been guided to a particular position of the workpiece.

27. The method according to claim 25, wherein:
   said reference system comprises an assembly line along which the workpiece is moved, and said source of position information is a master control system for said assembly line; and
   said time-related position of said tool comprises an absolute position in space.

28. The method according to claim 26, further comprising:
   monitoring operation of said tool; and
   based on said time-related assignment of said tool to said workpiece, and on said monitored operation of said tool, determining whether a defined assembly operation has been performed on said workpiece.

* * * * *